April 6, 1965

W. LEATHERS 3,176,414

TEST SCORING AND RECORDING MACHINE

Filed May 9, 1962

INVENTOR
Ward Leathers

April 6, 1965
W. LEATHERS
3,176,414
TEST SCORING AND RECORDING MACHINE
Filed May 9, 1962
3 Sheets-Sheet 2
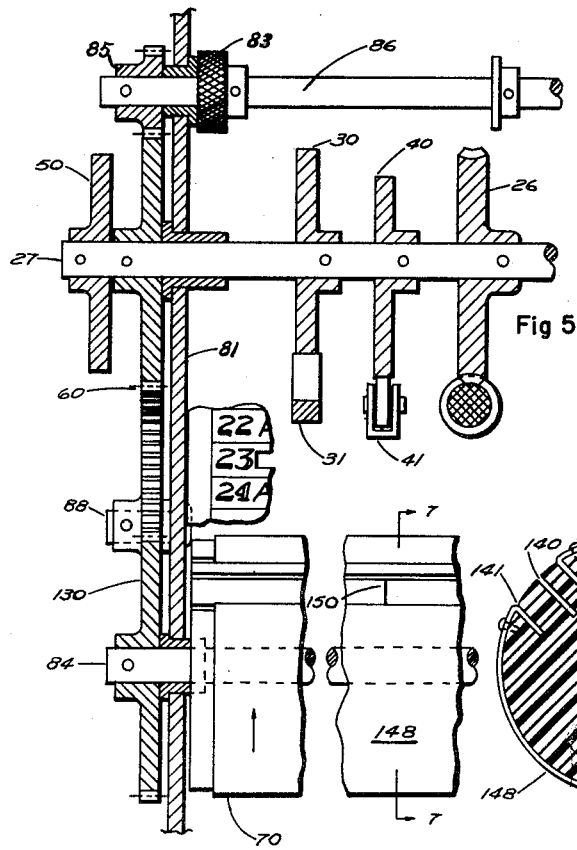
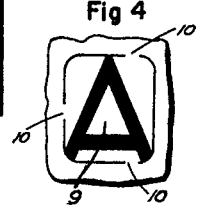
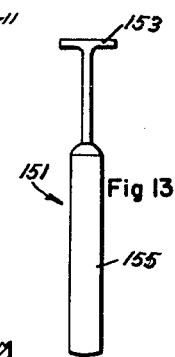
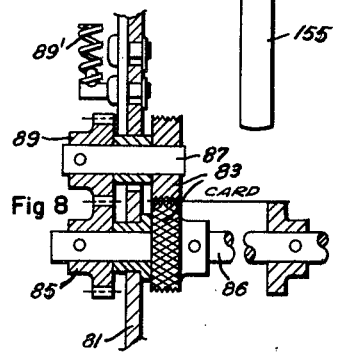
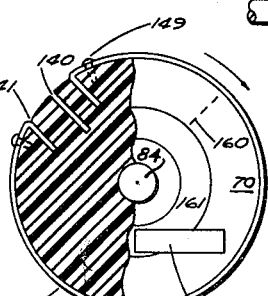
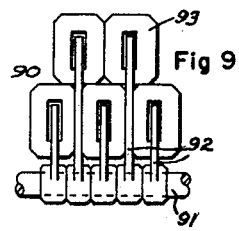
INVENTOR.
Ward Leathers April 6, 1965 W. LEATHERS 3,176,414
TEST SCORING AND RECORDING MACHINE
Filed May 9, 1962 3 Sheets-Sheet 3
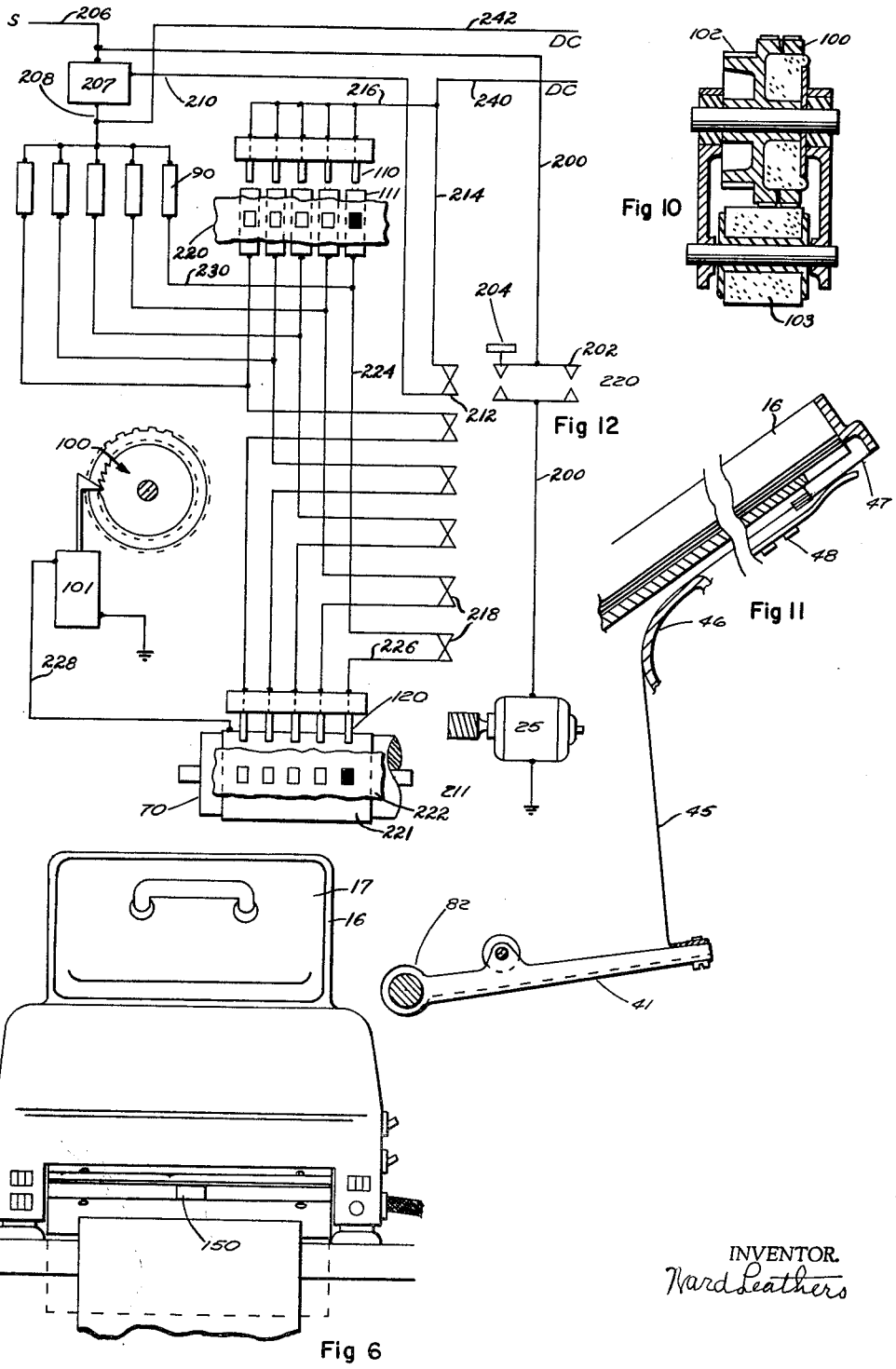
INVENTOR.
Ward Leathers

United States Patent Office 3,176,414
Patented Apr. 6, 1965

3,176,414
TEST SCORING AND RECORDING MACHINE
Ward Leathers, 23 Walker St., Massapequa Park, N.Y.
Filed May 9, 1962, Ser. No. 194,749
3 Claims. (Cl. 35—48)

The present invention relates to record controlled apparatus and more particularly to an improved test scoring and recording apparatus by means of which a student's test card, which has been perforated in various card columns by the student to represent his answers to a series of multiple-choice questions, may be processed in a novel manner whereby the number of correct answers rendered by the student may be totalized and the total printed on the card, the correct answer indicated by a special marking on the card whenever a particular question has been incorrectly answered, and whereby such special marking operations and other machine functions may be disabled to accommodate question and response permutations.

Briefly, the invention contemplates the provision of an apparatus which affords a first sensing station where a series of student's cards are successively scanned columnarly for perforations or other indicia which are representative of both correct and incorrect answers to a series of questions. The apparatus further affords a second sensing station where an answer card is repeatedly scanned for comparison with the test cards undergoing processing. The test cards are successively passed through the first sensing station in timed relation to the repetitive movement of the answer card through the second sensing station. The answer card is correctly perforated in columns which correspond to the columns of the test cards. At such time as a simultaneous scanning of sensing of perforations in corresponding columns of the cards at both sensing stations takes place, a counter is actuated so that correct answers are thus totalized. At the end of the totalization, printing mechanism is actuated to print the total on the student's test card. At such time as the portion of the test card passing through the first sensing station remains imperforate to indicate that the student has not rendered an answer to a given question, or has incorrectly perforated the test card in response to such question, means are provided whereby the test card is marked in the same general answer region to indicate to the student where the correct perforation should have been, thus enlightening the student as to the correct choice.

The provision of an apparatus of the character briefly outlined above being among the principal objects of the invention, numerous other objects and advantages, not at this time enumerated, will readily suggest themselves as the following description ensues.

In the accompanying three sheets of drawings forming a part of this specification, one illustrative embodiment of the invention has been shown.

In these drawings:

FIG. 2 shows a fragmentary student's score card having four main columns of numbers representing questions and multiple-choice response for same.

FIG. 3 shows a fragmentary matrix card corresponding to the student's score card of FIG. 2.

FIG. 4 is an enlarged fragmentary plan view of a push-out chad employed in connection with the student's and matrix cards of FIGS. 2 and 3.

FIG. 5 is an enlarged fragmentary sectional view, somewhat schematic in its representation, and taken substantially along the line 5—5 of FIG. 1.

FIG. 6 is a front elevational view of the apparatus.

FIG. 7 is a sectional view taken substantially along the line 7—7 of FIG. 5.

FIG. 8 is an enlarged sectional view taken substantially along the line 8—8 of FIG. 1.

FIG. 9 is a fragmentary elevational view of a printing unit employed in connection with the invention.

FIG. 10 is an enlarged sectional view taken substantially along the line 10—10 of FIG. 1.

FIG. 11 is an enlarged detail view, partly in section, of a portion of the structure shown in FIG. 1 and illustrating a picker mechanism employed in connection with the invention.

FIG. 12 is an electrical diagram of the invention.

FIG. 13 is a side elevational view of an auxiliary tool for removing the matrix card from the apparatus.

In all the above described views like characters of reference are employed to designate like parts throughout.

Figure 1:
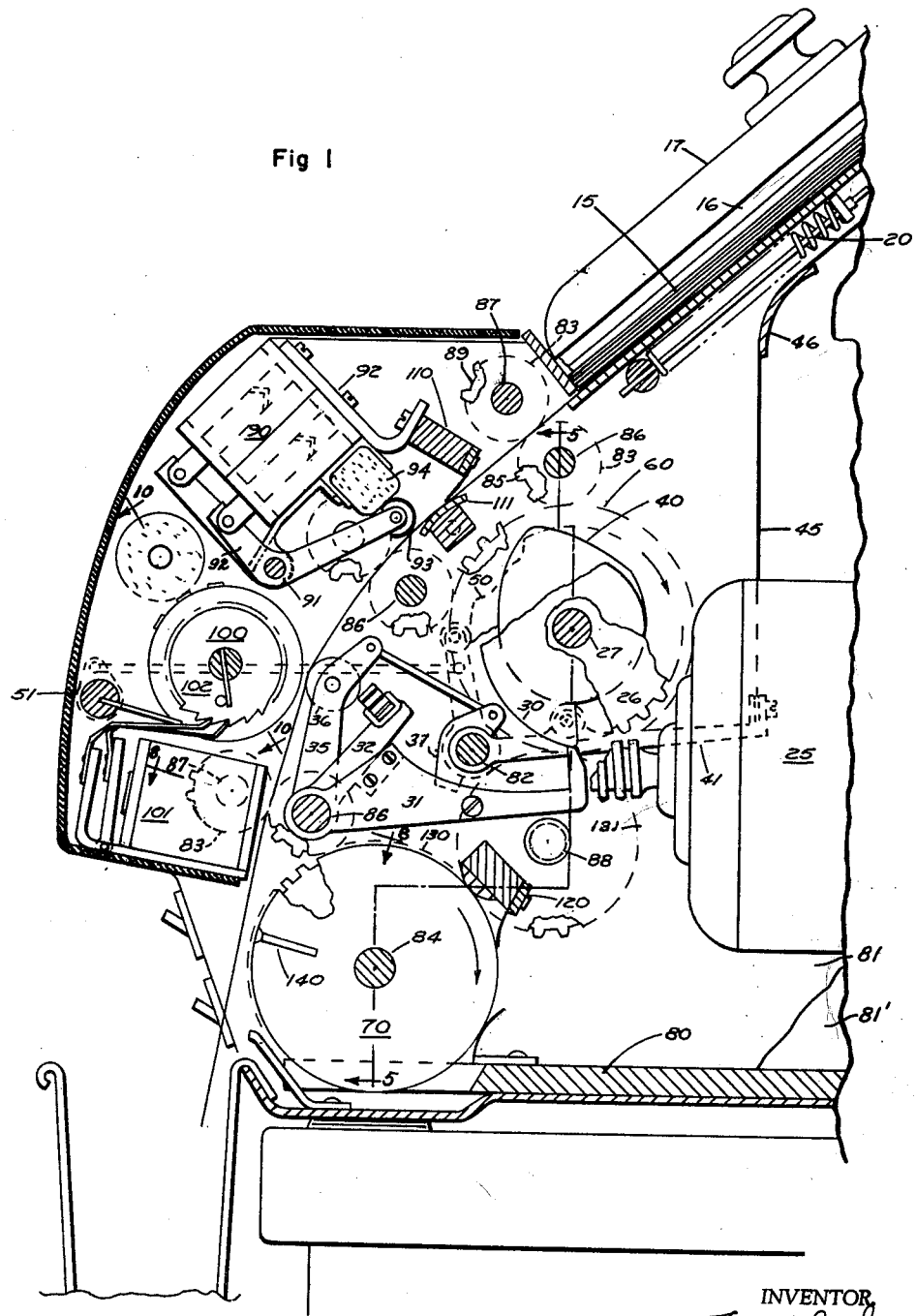
FIG. 1 is a longitudinal, fragmentary, cross-section of a scoring and recording apparatus constructed in accordance with the principles of the present invention.

My scoring and recording device is so shown in partial section in FIG. 1 that all the more important parts of its structure, their relationship and their relative size are delineated. Before a more detailed description is undertaken it is essential that the type of scoring cards and the means of marking them be more fully described.

An enlarged character A is shown in FIG. 4. This character is one of the five, ABCD and E shown in FIGS. 2 and 3, representing the 5-choice response on both student and matrix cards. Around the letter A the card has been completely cut through by die except at three points marked 10, thus establishing a chad or cut-out 9. Thus the chad is safely retained in the card although readily removable by student or teacher. This form of slaved chad is ideal for this purpose. All elective spots on both cards are so printed and so die-cut.

In use, student and matrix cards must be identical except for color but the printing and format at the top margin of these cards are different. Differences may be noted in FIGS. 2 and 3. The matrix card has at the top a broken die-cut line 11 whereby the portion 13 of the card thereabove may be readily bent 90° for entry into the scoring machine, and a cut-out 12 is provided for ease of removing the card from the machine as will clearly appear later.

Returning to FIG. 1, it will be noted that student cards are placed in a hopper 16 and covered by a weighted holder 17 in a manner common to the data card industry. A card-picker 47 (FIG. 11) starts the cards on their motor-driven journey through the machine. A motor 25, by means of worm-and-gear 26, drives a main shaft 27 which performs many functions in the course of one revolution, one revolution being one cycle of this machine. This shaft has disposed thereon a cam 30 for operating a print-hammer 32, a cam 40 for operating a picker-feed arm 41, a cam 50 for operating a reset bail 51, and a gear 60 for driving a series of card advancing rolls and the matrix-card drum 70. This machine has a base-plate 80 and two side plates 81 and 81' supported thereon which journal both ends of shafts 27, 82, 84, 86, and 87. The drum 70 is driven from the gear 60 through an idler gear 131 carried on a stud 88 mounted on the side plate 81. With the aid of FIG. 5 it will be more clearly seen how these motor-driven members are disposed with respect to the side plates 81 and 81'.

The cards being read are in width substantially the same as the distance between the side plates, so as this description proceeds it will be noted that four correction marking units 90 and four count-and-print units 100, one of each for each of the four columns of questions on the card, must lie clearly between the side-plates 81 and 81' without interference by the card drive mechanism.

A bar 110 between side plates 81, 81' supports four groups of properly insulated electric sensing-brushes with five brushes in each group corresponding in location to the chad-holes in the cards. These brushes are for electrically sensing or reading the holes in student cards. There are also four groups of sensing contact plates 111, there being one group of five plates for each column group. A similar assemblage of sensing brushes 120, carried on a similar bar, completes circuits through holes in the matrix card to the supporting drum 70.

As shown in FIGS. 1 and 8, a series of card-feed rolls 83, carried on shafts 86, 87, are driven by mating gears 85, 89 exteriorly of the side plate 81. The rolls 83 are spring pressed as at 89' for card-gripping purposes as is conventional in the art.

Four sets of red ink markers 90 (FIGS. 1 and 9) are required to mark the student cards at regions corresponding to the correct answers as sensed by the sensing brushes 120 at the matrix card. Accordingly, a shaft 91 extends between the side plates 81 and 81' and carries twenty solenoid-actuated lever arms 92 which, in turn, carry marking wheels 93 which receive their supply of ink from a felt inking roller 94. The levers and wheels are arranged in groups of five, there being one group for each card column group.

An electrically actuated counter 100, there being one for each card column, has but one print wheel with numerals thereon from 1 to 25. The wheel is indexed by a coil 101 through an associated drive-spring and detent-spring, both of which are removed from the ratchet teeth 102 (see FIG. 1) by a bail 51 immediately after printing. The wind-up is by a light spiral spring (not shown) and the return is to a zero pawl or pin. Inking is done by internal and external ink-carrying rollers 103 as shown in FIG. 10. Electric impulses come from a circuit through corresponding holes in both student's and matrix cards—as will be described presently. The bail 51 is actuated during the several milliseconds immediately following printing by a cam 50 on shaft 27 and the associated linkage shown.

Printing is accomplished by a print-hammer 32 striking the under side of the card and thereby impinging it against the print wheel 100. A pawl 31 rotatably mounted on shaft 83 and heavily torqued counterclockwise by a spring (not shown) coiled about the shaft, throws the hammer 32 when the cam 30 on the shaft 27 reaches the print position. The hammer 32 is also rotatably mounted on the shaft 83 and it is lightly spring-impelled away from the paper. All four print hammers are actuated by the same cam 30 and pawl 31.

It is desirable that there be no print actuation when no card appears between the hammer and the print wheel. By means of an arm 35, rotatably mounted on the shaft 83, a linkage is provided which eliminates the stated action. The arm 35 carrying a small wheel 36 is lightly spring-impressed toward the card. If there is no card present the wheel moves so that by the linkage shown it turns a pawl 37 on the shaft 82 which then interrupts the free motion of the printing arm 31.

Card picking is an old art requiring little description here. The picker arm 41, rotatably mounted on the shaft 82, and moved by means of a roller thereon and the cam 40, has attached to its outer end a tape 45 which slides freely about a curved, polished metal part 46. The upper end of the tape is joined to a picker slide 47, FIG. 11, which is held in place by a spring 48. Picker slide and picker arm are returned to place by a spring 20, FIG. 1. Picker timing is phased by the cam 40.

Turning to FIG. 7, the roller 70 that carries the matrix card is composed primarily of a plastic cylinder mounted firmly on the shaft 84 which is bearing-mounted in the side plates 81–82. The gear 60 on the shaft 27 drives a gear 130 on this shaft by means of a stud-mounted idler 131. There are three slots 140, 141, 142 cut into this cylinder and extending the length thereof. The slot 140 is for the insertion of the foldable flap on the top of the matrix card. When inserted and the drum is turned in the direction of the arrows the card is wrapped about the roll. The slots 141 and 142 are for the insertion of the edges of a thin sheet of electrically-conducting metal 148. This sheet is further attached by means of small flush-head screws as at 149. This cylinder has a square hole or void 150 medially thereof (FIG. 6) for the purpose of removing the card from the cylinder. By means of a special tool such as has been shown at 151 in FIG. 13, and having a T-head 153 and handle portion 155, the T-head may be inserted in the slot 150 and through the cut-out 12 (FIG. 3) and turned through an angle of 90° so that when the tool is pulled rearwardly, the folded flap 13 on the card will be withdrawn from the slot 140 in the cylinder 70 and the card pulled from the apparatus.

An electric connection is provided, as at 160, between the conductive sheet 148 and an annular conductive disc 161 on the end of the cylinder. A contact spring or brush 162, injected through the end plate 81, maintains constant contact with the disc 161. This completes the circuit from brushes 120 to the counter-printer coils 101 (FIG. 12).

Referring now to FIG. 12, alternating current from a suitable source such as a commercial power line S is supplied to the motor 25 through a line 200 having a manually operable switch 202 and a push button 204 interposed therein. The switch 204 is momentarily operable for a limited period of time to bring the cylinder 70 to a position where the slot 140 is accessible for card insertion.

The source S is connected by a lead 206 to a transformer-rectifier power supply 207 which delivers direct current to a lead 208 at a predetermined low voltage insufficient to actuate the indexing and printing coil 101, and which delivers direct current at a higher voltage sufficient to actuate this coil. The lead 210 is connected to a manual switch 212 which, in turn, is connected by a lead 214 to a common lead 216 for the various brushes 110 of the student's card sensing instrumentalities. A series of selectively operable manual switches 218 are provided and afford adaptation to different question and response arrangements which are made possible by the nature of the student's card of FIG. 2. These switches 218 are connected to respective marking coils 90 and constitute selective disabling means therefor.

A fragment of a student's card has been designated at 220 and a similar fragment of a matrix card at 222. Suppose now that the correct response to a given test question entails removal of a cut-out or chad 9 by the student in the extreme right hand column of the card 220 as seen in FIG. 12 and represented by the black void, the corresponding chad being removed from the matrix card, a circuit will extend from the power supply 207, through lead 210, switch 212, leads 214, 216, brush 110, contact plate 111, lead 224, one of the switches 218, lead 226, brush 120, contact plate 221, lead 228 and coil 101 so that accumulattion and printing will take place. At the same time, regardless of the manner in which the student has dechaded his card, red ink marking of the student's card by reason of energization of the extreme right hand marking unit 90 through lead 208, the marking unit itself, and lead 230 extending to the previously described circuit, will take place. This marking of the correctly dechaded student's card will, of course, be superfluous since the actual removal of the chad will suffice to show that the card has been correctly processed by the student. Red ink marking of the student's card when he has incorrectly dechaded his card, or when he has failed to remove a chad 9, is important and constitutes one of the principal features of the present invention.

Assuming now that a student has incorrectly dechaded his card and that a chad 9 other than the extreme right hand chad has been removed, the previously described circuit through the coil 90 still will be effective inasmuch as the perforation in the right hand column of the matrix card remains unchanged. Thus, red ink marking of the right hand column of the student's card will take place. Removal of a chad in the matrix card is the controlling factor and a marking wheel 93 will strike the student's card in the column where the student should have removed a chad. However, since the perforations in the matrix and student's cards do not agree column-wise, the current necessary for operation of the printing coil 101 is blocked by an imperforate portion of the matrix card on the drum 70.

Take-off leads 240 and 242 extend from the lead 201 and common brush lead 216 for the purpose of serving other card column groups.

While there have been shown and described the fundamental novel features of the invention as applied to a preferred embodiment, it will be understood that various omissions and substitutions and changes in the form and details of the apparatus as illustrated and in the operation thereof may be made by those skilled in these arts without departing from the spirit of the invention.

I claim:

1. In a machine for grading and marking secondary student response cards according to their comparison with perforated data appearing on a similar primary matrix card and relating to multiple choice responses to a series of questions, the secondary and primary cards having correspondingly arranged groups of multiple choice positions, the multiple choice positions of the primary card being teacher-perforated in accordance with correct responses to said questions, and the positions of the secondary cards being variously perforated so as to be indicative of correct and incorrect answers to said questions, a rotary cylinder for supporting the primary card in wrap-around fashion, means for rotating said cylinder, a series of sensing devices cooperating with said cylinder for repeatedly sensing the multiple choice positions on the primary card, during rotation of the cylinder means providing a linear path of movement for secondary cards successively fed to the machine, means establishing a sensing station, a marking station and a printing station along said path, means for impelling the secondary cards along said path in endwise fashion in timed relation to the rotation of said cylinder, a series of devices at said sensing station for sensing the multiple choice positions on successive secondary cards passing through said sensing station, a series of marking devices at said marking station for marking the multiple choice positions on successive secondary cards passing through the marking station, a cumulative totalizing printing wheel at the printing station for printing a numerical designation on successive secondary cards passing through said printing station, a correct response counter, means responsive to the sensing of a perforation in a multiple choice position of the primary card on the cylinder for actuating a corresponding marking device at the marking station, means responsive to the simultaneous sensing of perforations in the multiple choice positions of the primary card on the cylinder and a secondary card at the sensing station for energizing said counter, means operatively connecting the printing wheel and counter for advancing the printing wheel upon each energization of the counter, and means operable in timed relation with the rotation of said cylinder for effecting relative movement of the printing wheel and the opposed portion of a secondary card at the printing station into printing engagement.

2. In a machine for grading and marking secondary student response cards, the combination set forth in claim 1 including, additionally, means operable in response to the absence of a secondary card at the printing station for disabling the means for effecting relative movement of the printing wheel and the opposed portion of a secondary card at the printing station.

3. In a machine for grading and marking secondary student response cards, the combination set forth in claim 1 including, additionally, means for selectively disabling the actuating means for the marking devices at the marking station.

References Cited by the Examiner
UNITED STATES PATENTS

| | | | |
|---|---|---|---|
| 2,048,976 | 7/36 | Sveda et al. | 35—48 |
| 2,052,442 | 8/36 | Black | 35—48 |
| 2,150,256 | 3/39 | Warren | 35—48 |
| 2,528,828 | 11/50 | Henry | 35—48 |
| 2,872,038 | 2/59 | Andersen | 35—48 |

JEROME SCHNALL, *Primary Examiner.*

L. SMILOW, LAWRENCE CHARLES, *Examiners.*